United States Patent
Holtzman et al.

(10) Patent No.: US 6,612,674 B1
(45) Date of Patent: Sep. 2, 2003

(54) SYSTEM FOR AVOIDING IMAGE EDGE DELETION IN A DIGITAL PRINTING APPARATUS

(75) Inventors: Jacqueline Holtzman, Penfield, NY (US); Steven H. Inouye, Cypress, CA (US); Kenneth B. Schleede, Webster, NY (US); Ray U. Merriam, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/179,554

(22) Filed: Jun. 24, 2002

(51) Int. Cl.[7] ............................................... B41J 29/393
(52) U.S. Cl. .......................... 347/14; 347/19; 358/1.9; 358/1.2
(58) Field of Search .............................. 347/19, 14, 15, 347/37, 16; 358/1.2, 1.9, 1.11, 1.17

(56) References Cited

U.S. PATENT DOCUMENTS 6,478,399 B1 * 11/2002 Mitsuzawa et al. ............ 347/19
6,520,614 B2 *  2/2003 Kaneko ....................... 347/14

* cited by examiner

*Primary Examiner*—Lamson Nguyen
(74) *Attorney, Agent, or Firm*—R. Hutter

(57) ABSTRACT

Certain types of digital printers are susceptible to the deletion of image data toward the edge of print sheets of certain sizes. To avoid deletion of significant image information, an interpreter associated with a printer can reduce and translate each printed image slightly, to cause the printed image to be "shrunk away" from edge areas on the print sheet. A program associated with the interpreter reads the header of a job submitted thereto, and determines whether this image reduction is desirable, based on the identity or type of a source computer submitting the job.

6 Claims, 2 Drawing Sheets

SYSTEM FOR AVOIDING IMAGE EDGE DELETION IN A DIGITAL PRINTING APPARATUS

TECHNICAL FIELD

The present invention relates to digital printing apparatus, such as an ink-jet or electrostatographic "laser printer," which prints images based on image data originating in a computer data file.

BACKGROUND

Digital printers, which print images such as documents which are retained as data files in computers, are now commonplace in offices. In the standard model of digital printing, data to be printed is retained in the memory of what will here be called a "source computer," which may be of any type, such as a print driver, print server, personal computer, or mainframe. When the data to be printed, in the form of a file, is sent from the source computer to a printer, the data is in a page description language (such as PCL or Adobe® PostScript™) or some other format, such as TIFF or a fax format such as CCITT. At the printer, software resident therein known as a "decomposer" or "interpreter" converts the file from its original page description language or format into code which ultimately operates the printer hardware, such as by modulating a laser or controlling an ink-jet printhead over time, to form the desired printed images.

In real-world situations, certain practical limitations of both source computers and printers must be taken into account. With particular relevance to the present invention, certain types of printers from various manufacturers may be inherently incapable, by virtue of their basic design, of printing images on an entire sheet which passes therethrough. Rather, printed images from such printers can be no larger than slightly less than the total area of the sheet: the edges of each sheet will not be able to be printed upon. This phenomenon, which is known as "edge deletion," is fairly common with inexpensive printers. In such cases the edge deletion extends by about ¼ inch on at least two sides of each printed sheet. With regard to different types of source computers, certain computers, such as legacy mainframes, may consistently provide image data to a printer which is subject to image deletion and a bad consequence thereof. For example, if a mainframe regularly outputs a spreadsheet in small type and with rudimentary formatting to a printer, if the printer is incapable of printing to the edge of a sheet, it is likely that an entire row or column of the spreadsheet may be deleted.

SUMMARY OF THE INVENTION

According to one aspect of the present invention, there is provided a method of printing an image based on digital image data, the digital image data including a header. The header is searched for a data string which identifies the digital image data as originating from an accepted source computer. If the data string is not in the header, an alteration is performed on the image data, the alteration having an effect of causing a printed image resulting from the data to avoid an edge of a print sheet on which the printed image is printed.

DETAILED DESCRIPTION

Figure 1:
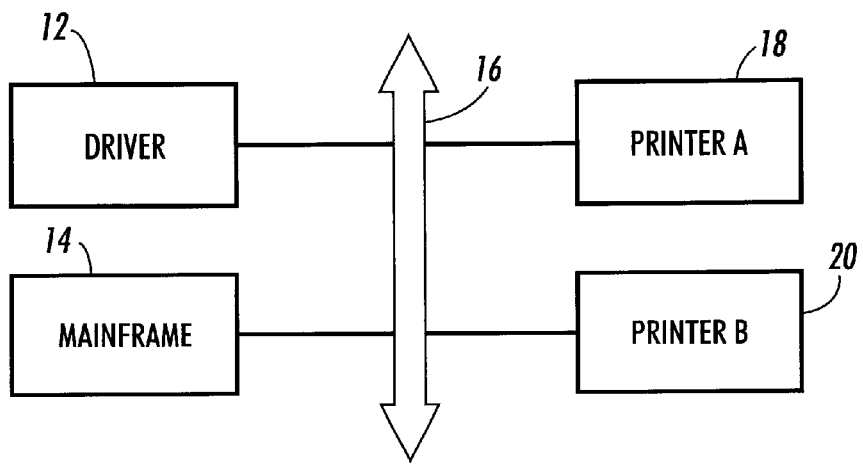
FIG. 1 is a simplified diagram showing a context of the present invention.

FIG. 1 is a simplified diagram showing a context of the present invention. A source computer, such as shown as a driver 12 (which resides on a computer or server) or mainframe 14, communicates through network 16 to a population of useable digital printers of various types and models, here shown as printers 18 and 20. It is also possible to have a source computer be resident with the printing hardware, such as in the case of a digital copier, where images are captured by a hard-copy scanner and retained until printed as copies. As mentioned above, when it is desired to print out image or other data which is present on one of the computers 12, 14, the image data, in a predetermined standard format or language such as Adobe® PostScript™, is directed to a selected printer such as 18. An interpreter program typically resident in (or otherwise associated with) the printer 18 converts the image data in the standard format to code which is substantially directly operative of the hardware within the printer, to output the image on one or more sheets.

If it is known, by the model and type, or even by past behavior, of a particular printer such as 18 that the printer is susceptible to edge deletion on one or more edges of each sheet, it becomes desirable to avoid the loss of significant image data (even purely esthetically significant data, such as a border design). One way to avoid such a loss is to take the image as desired to be printed on one sheet, or on each sheet of a multi-page document, and reduce the image so it is slightly smaller than the sheet on which it is intended to be printed. Such a reduction function is typically known and accessible within interpreters. In this way any significant image data toward the edges of an image desired to be printed is "shrunken away" from an edge area on a sheet which may be subject to edge deletion in a particular printer.

Figure 2:
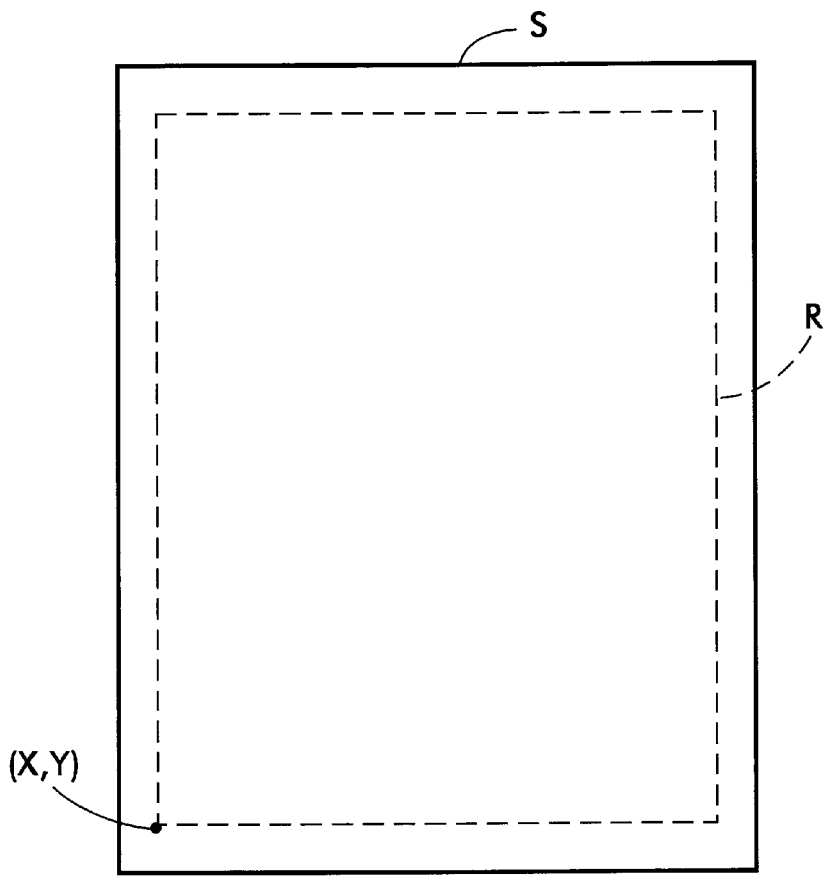
FIG. 2 is a diagram of a typical print sheet, illustrating a principle relevant to the present invention.

FIG. 2 is a diagram of a typical print sheet S, illustrating a principle relevant to the present invention. The edges of the sheet S as shown represent the available surface area of a sheet on which an image is desired to be printed. If the image to be printed is deliberately reduced, so that for example the printed image occupies only the area indicated as R and not the entire sheet S, image data toward the edge of desired image, such as for example the end row or column of a spreadsheet, is separated away from the edge of the sheet S, where in some cases it may be subject to edge deletion. Typically, a useful extent of such reduction is about 96%.

Further, because the reduction functions inherent in some decomposers and/or printer hardware cause the image to be reduced not towards the center of an image but toward a particular corner of the image, it may also be desirable to translate the reduced image R by a predetermined amount shown as coordinates (X, Y), to simulate an even reduction toward the center of the image, so that each the image is shrunken away from each edge by roughly the same amount. Such image translation is also commonly accessible through known interpreters.

Although it is possible simply to reduce (and as necessary translate) every image sent to a particular printer such as 18 which is known to exhibit edge deletion, or alternately to reduce every image sent from a particular source computer which outputs, for instance, small-type, minimally formatted spreadsheets, a more versatile system is able to identify which combinations of source computer and printer (or even job type) may be at risk of noticeable edge deletion, and thus perform reductions or other image alteration only in those cases. In other cases, where such image alteration is not necessary, there will be no image alteration. Thus, there is provided, according to this embodiment, means for determining, for each job sent to a particular printer such as 18, whether there are conditions which mandate image alteration to avoid conspicuous edge deletion.

Figure 3:
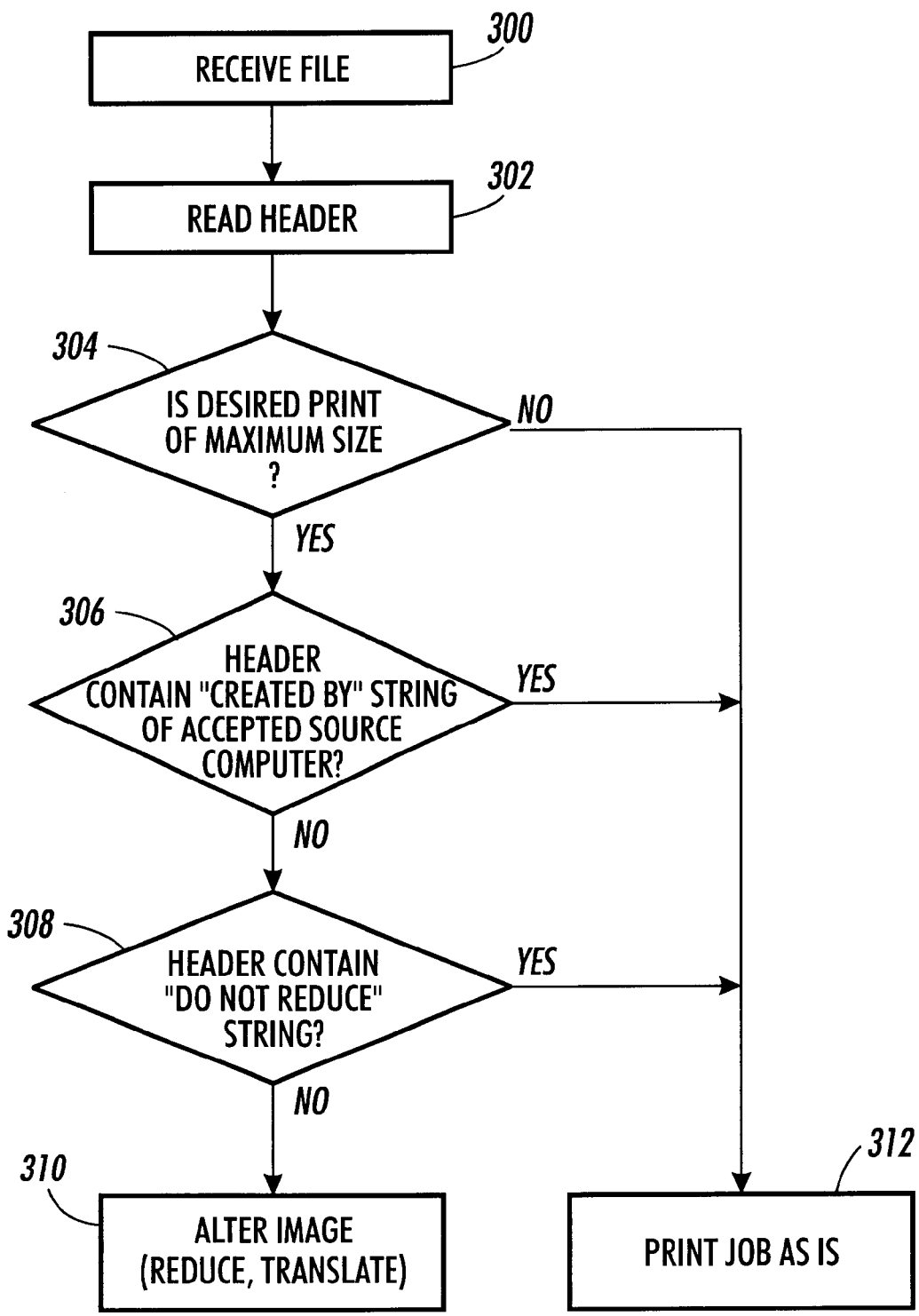
FIG. 3 is a flowchart illustrating steps which take place within an interpreter associated with a printer upon receipt of a print job.

FIG. 3 is a flowchart illustrating steps which take place within an interpreter associated with a printer upon receipt of a print job. It should be kept in mind that the following description applies to an example printer, and that the general functions such as shown in the FIG. 3 example are likely to be modified for specific conditions in a real-world implementation.

When a file (a set of data, including data manifesting images desired to be printed) is received, such as at step 300, the "top" of the file can be read as a "header," as shown at step 302. Use of a header is common, particularly with page description languages such as PostScript™. The header typically includes information about what size sheet the images is desired to be printed on, in the case where a printer is capable of outputting prints of various sheet sizes. The header can also contain a string describing the source computer, particularly a type of print driver used.

One consideration when trying to determine whether a job is at risk for edge deletion is the size of the sheet desired to be printed on. Typically, edge deletion would be a problem only with the largest size sheet the printer is capable of outputting. In the case of a short-edge-feed printer, because a letter-size document is slightly wider in the short edge direction than an A4 sheet, it is possible that edge deletion may be a risk for letter-size paper only; because A4 is longer than letter in a long-edge context, the opposite may be true in a long-edge-feed printer. In any case, it may be known, by virtue of hardware design, that only certain size sheets are at risk for image deletion, and one function of the method is to determine whether an at-risk size sheet is being requested, as shown at step 304.

In currently common embodiments, page size information may not be located in the header, as here described, but may appear in other code associated with a job, for example, the "setpagedevice" commands within PostScript™, although such code as currently supported may be difficult to parse. Alternately, a file can have attached thereto a header which specifies a page size; this is done in Web UI interfaces used in Xerox® DocumentCentre® products and systems.

Sophisticated systems permit a driver or other source computer to place a "created by" string in a heading of a file sent to a printer. Typically such a string would bear some identification of the type of source computer which originated the file. The string does not, of course, have to include the exact words "created by," but should be some sort of string which can identify the file to the printer as coming from an "accepted" source computer, i.e., a source computer which will not send image data requiring image alteration. In some cases, the make and model type of the driver or other source computer is placed in the header as standard practice, e.g. an actual string currently used is "Driver: Xerox DC 490/480/470/460 PS3 2.04.09 01.02.22". If no such familiar "created by" string is found, even a "created by" string from some unfamiliar driver, the interpreter will by default alter the image to avoid conspicuous edge deletion. The interpreter should have access to some sort of look-up table which will recognize some character string in the header as being related to the file not needing image alteration, as shown at step 306.

Another possible strategy for determining whether a source computer is "accepted" is to search the header (or other source) for a specific identity, as opposed to type, of the source computer, such as by the source computer's network address or equivalent data. The interpreter could have access to a list of the network addresses of accepted computers likely to send jobs thereto. However, there may be certain practical difficulties with this approach using currently-supported systems, such as if a file is created on one computer, temporarily stored on a second computer, and then printed using another, and one of the computers is not an accepted source. Nonetheless, the strategy may become practically feasible with future iterations of computer systems and network protocols, which may permit such network addresses to travel more readily and accessibly with data to be printed.

In some practical situations, if it is known that a certain source computer consistently outputs images susceptible to edge deletion, the image alteration to avoid such edge deletion may be carried out at the source computer itself; in other words, a computer may have already been "fixed" in this respect in the past. In such a case, it would be superfluous to have each image altered again at the printer, which would result in a twice-reduced image. For these situations in which the image data output from the source computer is known not to require further alteration, there can be provided in the header a predetermined code which the printer software can interpret as a "do not reduce" or "do not alter" string, which, when recognized such as at step 308, instructs the interpreter not to perform any alteration on the image being printed. This "do not reduce" code can be programmed to be associated with the header of every job sent from a source computer, or, alternately a user sending a job from the source computer can be given the option of in effect sending the "do not reduce" code on a per-job basis. Also, placement of the "do not reduce" code could be done as an override feature at the printer itself. (Once again, in a practical embodiment, phrases like "do not reduce" or "do not alter" do not have to appear in any header, only some code string that can be interpreted as such.) In summary, according to the present invention, an image desired to be printed will be reduced or otherwise altered to avoid the effects of image deletion unless (a) the desired print is not of a sheet size which presents a risk of edge deletion; (b) the source computer is identified as not presenting a risk of edge image deletion; or (c) there is a specific instruction in the header not to alter the image. So, as shown at step 310, the image is reduced or otherwise altered, or as at 312, the image is printed "as is" from the source computer.

What is claimed is:

1. A method of printing an image based on digital image data, the digital image data including a header, comprising the steps of:

searching the header for a data string which identifies the digital image data as originating from an accepted source computer;

if the data string is not in the header, performing an alteration on the image data, the alteration having an effect of causing a printed image resulting from the data to avoid an edge of a print sheet on which the printed image is printed.

2. The method of claim 1, the alteration including a reduction of the printed image.

3. The method of claim 1, the alteration including a translation of the printed image.

4. The method of claim 1, the data string being related to a source computer being of an accepted type.

5. The method of claim 1, further comprising determining the sheet size for the desired printed image;

if the sheet size does not present a risk of image edge deletion, not performing an alteration on the image data.

6. The method of claim 1, further comprising searching the header for a data string to be interpreted as a "do not reduce" instruction;

if the "do not reduce" instruction is found in the header, not performing an alteration on the image data.

* * * * *